United States Patent [19]
Wipper

[11] Patent Number: 5,967,071
[45] Date of Patent: Oct. 19, 1999

[54] ENERGY EFFICIENT SYSTEM AND METHOD FOR REDUCING WATER FRICTION ON THE HULL OF A MARINE VESSEL

[76] Inventor: Daniel J. Wipper, 719 East Blvd., McHenry, Ill. 60050

[21] Appl. No.: 08/982,622

[22] Filed: Dec. 2, 1997

[51] Int. Cl.[6] .................................................. B63B 1/38
[52] U.S. Cl. ........................................................ 114/67 A
[58] Field of Search ............................................ 114/67 A

[56] References Cited

U.S. PATENT DOCUMENTS

| | | | |
|---|---|---|---|
| 3,075,489 | 1/1963 | Eichenberger | 114/67.1 |
| 4,340,004 | 7/1982 | Kanei | 114/67 A |
| 4,393,802 | 7/1983 | Rizzo | 114/67 A |
| 4,523,536 | 6/1985 | Smoot | 114/67 R |
| 4,528,931 | 7/1985 | Lantz | 114/288 |
| 4,926,771 | 5/1990 | Hull | 114/61 |
| 5,031,559 | 7/1991 | Bartholomew | 114/67 A |
| 5,054,412 | 10/1991 | Reed et al. | 114/67 A |
| 5,117,882 | 6/1992 | Stanford | 114/67 A |
| 5,176,095 | 1/1993 | Burg | 114/67 A |
| 5,476,056 | 12/1995 | Tokunaga et al. | 114/67 A |
| 5,524,568 | 6/1996 | Bobst | 114/89 |
| 5,575,232 | 11/1996 | Kato et al. | 114/67 A |

FOREIGN PATENT DOCUMENTS

WO 84/049   12/1984   WIPO .

Primary Examiner—Sherman Basinger
Attorney, Agent, or Firm—Jon Carl Gealow

[57] ABSTRACT

An energy efficient system for reducing the water friction on the hull of a marine vessel. The contact of water with the portion of the outer surface of the hull of a marine vessel which normally engages the water is reduced by the strategic induction of pressurized or compressed air or gas to cover that outer surface. The compressed air is retained on the outer surface by various grooves, channels or semi-flat surfaces running the length of the vessels bottom and in certain applications vertical sides, which prevent the flow of the compressed gas to the surface of the water. The pressurized air or gas is recaptured before exiting the stern or sides and recycled to the bow through an energy efficient circulation system, thus recovering the energy in the compressed air or gas which has flowed from bow to stern. The larger and the deeper the hull displacement, the greater is the efficiency realized by the recycling of the compressed air or other gas.

48 Claims, 7 Drawing Sheets

ENERGY EFFICIENT SYSTEM AND METHOD FOR REDUCING WATER FRICTION ON THE HULL OF A MARINE VESSEL

FIELD OF THE INVENTION

The present invention relates to a method of reducing the water friction on the hull of a marine vessel by separating at least a major portion of the outer surface of the hull, which would otherwise engage the water, from the water, by a layer of air or other gas. More particularly it relates to an energy efficient system and method for providing and maintaining the layer of air between the outer surface of the hull of a vessel and the water through which it is moving.

BACKGROUND OF THE INVENTION

Of the energy required to move a vessel through water, a major portion is consumed in overcoming the friction between the outer surface of the hull of the vessel and the water through which the vessel is passing. It is well known that reducing the water/hull contact area of a vessel will improve efficiency. In the past many attempts have been made to supply air or gas in the form of bubbles or streams to separate the water from the hull so as to reduce the friction there between. However, such attempts have provided little gain and in some cases loses in efficiency due to the loss of energy, in the form of the pressurized air, which flows away from the hull. The energy loss multiplies, and the efficiencies of such attempts rapidly dropped off, the deeper in the water the air is supplied, since it takes more energy/pressure to supply the air/gas at greater depths. Thus, such prior attempts were greatly limited as to the depth at which they could be effectively used. Because of the loss of efficiency at greater depths, their use has been primarily restrict to shallow draft or planning type hulls. Using reduced amounts of air/gas more effectively as micro-bubbles, or using the air in combination with textured surfaces is usually less effective in reducing friction. The efficiency of both of these methods is also limited by depth as previously discussed.

These many attempts over the years, gave up the energy stored in the form of pressurized air/gas as it exits the stern or sides and returned on its own to the surface of the water as bubbles or streams. Numerous systems and methods have been disclosed in the past using air between the outer surface of the hull of a vessel and the water to reduce friction, and therefor the energy necessary to propel the vessel through the water. The following patents disclose variations in such systems:

| U.S. Pat. No. | Inventor(s) |
|---|---|
| 4,340,004 | Kaneil |
| 4,393,802 | Rizzo |
| 4,523,536 | Smoot |
| 4,528,931 | Lantz |
| 4,926,771 | Hull |
| 5,031,559 | Bartholomew |
| 5,054,412 | Reed et al |
| 5,117,882 | Stanford |
| 5,176,095 | Burg |
| 5,476,056 | Tokunaga et al |
| 5,524,568 | Bobst |
| 5,575,232 | Kato |

The Kanei, Rizzo, Hull, Reed et al, and Burg patents reveal the use of channels or grooves of some sort on the external surface of the hull of a vessel, with air or gas being supplied to the channels or grooves, to reduce the surface area of contact of water with the hull of the vessel. The Hull patent shows the use of an axial supply fan 23 to supply the air. The Bartholomew, Stanford, Tokunaga et al, Bobst, and Kato et al patents disclose various means for introducing air bubbles, or an air film, over the outer surface of the hull of a ship. The remaining Smoot and Lantz patents are directed to other schemes for reducing the water drag on the hull of a ship.

While the disclosures of these patents show various ways of providing air to at least a portion of the outer surface of the hull of a vessel, to reduce the surface area of contact of water with the hull, they are all similar in that the pressurized air is permitted to escape from the hull at the sides or stern of the vessel, and presumably flow or bubble to the surface of the water in which the vessel is moving. In order to force air or any other gas to occupy a space between the hull and the water, it is necessary to provide the air or other gas at a pressure which is at least equal to, or greater than, the pressure which would be exerted by the water on the hull if the air or gas were not interposed there between. The further below the surface of the water at which the air must be supplied to the interface between the hull and the water, the greater the pressure at which it must be supplied. Thus, on fully loaded ocean going vessels, having a deep draft, air at considerable pressure must be provided to the lower portions of the hull. While providing an air interface between the outer surface of the hull and the water will reduce the friction between the water and the hull, the loss of the compressed air at the stern of the ship represents considerable lost energy. While the performance of the ship with respect to energy used to propel the ship may be improved in this way, the energy consumed in providing the compressed air, which is lost at the sides or stern of the ship, may well outweigh any improvement in performance with respect to overall energy used to propel the ship. Thus, if the loss of compressed air could be eliminated or at least reduced to a minimum, considerable less energy would be required to supply the necessary compressed air.

Accordingly, it would be advantageous to provide a method and system for reducing water friction on the hull of a marine vessel, which provides a gas, usually air, interface between the outer surface of the hull and the water in an energy efficient manner. More particularly, it would be advantageous to provide such a method and system wherein the compressed gas is recovered, usually downstream toward the stern of the vessel, thereby reducing the energy otherwise lost in permitting the compressed air escaping at the stern of the vessel.

SUMMARY OF THE INVENTION

It is an object of this invention to provide an energy efficient method and system for reducing water friction with the outer surface of the hull of a marine vessel. It is a further object of this invention to provide such a system wherein the friction between the outer surface of the hull of a marine vessel and the surrounding water is reduced by providing a gas or air interface there between. It is still another object of this invention to provide such an energy efficient system, wherein the compressed gas or air forming the interface is introduced toward the bow of the vessel, through distribution opening or vents, and is recovered for recycling through collection openings or holes located at the stern of the vessel, or on the sides of the vessel in the flow path of the compressed gas or air released through the distribution openings. Thus, the energy stored in the compressed gas is recovered, rather than it being lost as compressed air bubbling or streaming to the surface of the water after flowing away from the sides or stern of the ship.

An energy efficient method and system for reducing water friction on the hull of a marine vessel in accordance with this invention includes a source of compressed gas, and a distribution system including a vent arrangement for introducing the compressed gas towards the bow of the vessel to a barrier arrangement on the outer surface of the hull. The barrier arrangement retains the compressed gas in the form of streams or bubbles against the outer surface of the hull, thereby preventing it from rising to the surface of the water. A collection arrangement, including holes or openings towards the stern of the vessel, recovers the compressed gas. The gas recovered by the collection arrangement is recycled, to again flow through the vent arrangement to the outer surface of the hull. The system of this invention is designed so as not to adversely effect the stability, or handling performance of the vessel. Further, the system is designed so as not to significantly reduce either the cargo or passenger handling capacity of the vessel or its reliability. The energy efficient method of this invention allows for systems to be designed for manufacture and installation on a ship in an economical and effective manner.

It is contemplated by this invention that various methods of producing compressed gas may be used. Depending upon the draft of the vessel, it may be necessary, in accordance with this invention, to supply compressed gas at various pressures. Various barrier arrangement, some of which will be hereinafter described, are used to maintain a compressed gas interface between the outer surface of the hull of a vessel and the water in which the hull rests. Further, in accordance with this invention, various arrangement may be used for introducing the compressed gas to the barrier arrangement. For instance, the compressed gas may only be introduced adjacent the bow of the vessel, or it may be introduced at various locations along the length of the vessel. The compressed gas recovered by the collection arrangement may be processed to remove entrained water before it is reintroduced to the barrier arrangement.

Providing that a suitable barrier arrangement can be provided on the hull of a vessel to retain a compressed gas interface between the outer surface of the vessels hull and the water, the energy efficient system of this invention may be used on any type of vessel, be it a self powered vessel or a vessel such as a barge which is propelled by another vessel, such as a tug. In the case of a non-self powered vessel, such as a barge, the source of compressed gas may be located on the barge, or it may be located on the tug, with the compressed gas being supplied to the barge or barges by a suitable distribution system. In addition to use on non-self powered vessels, the method and system of this invention is also applicable to totally submergible vessels such as submarines. Because the compressed gas generally covers the entire length of the vessel from bow to stern, the efficiency of the method and system of this invention, as well as that of most of the prior systems, such as those disclosed in the above-mentioned patents, will increase with the length of the vessel. Thus, the longer the vessel, the greater the gain in efficiency to be realized by the method and system of this invention.

DETAILED DESCRIPTION OF THE PREFERRED EMBODIMENT

Figure 1:
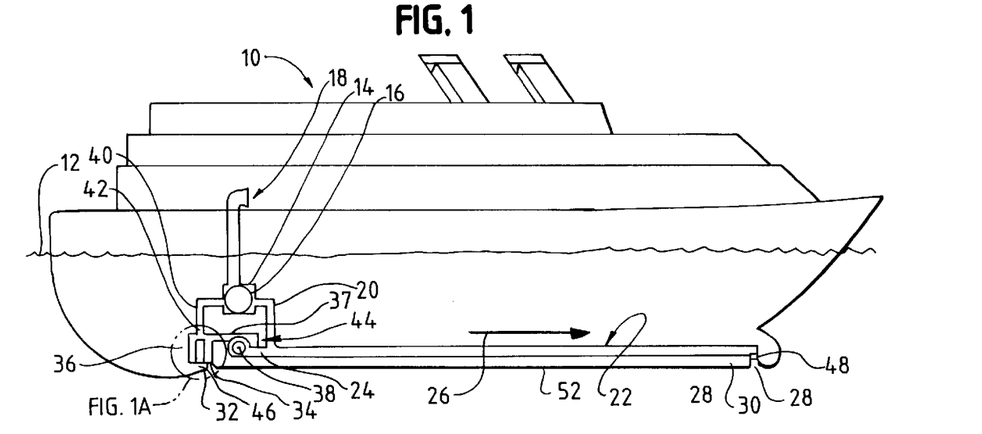
FIG. 1 is a side elevation view of a marine vessel, partially in cross-section, which illustrates an energy efficient system for reducing water friction on the hull of a marine vessel in accordance with one embodiment of this invention.

Referring to FIG. 1, a vessel 10 is shown floating in a body of water having a top surface 12. An irregular portion of the vessel 10 is broken away to show an energy efficient system, in accordance with this invention, for reducing the drag of water on the hull of the vessel as it is propelled through the water. The energy efficient system includes an air compressing and compressed air storage system 14, which includes an air compressor 16. Air is provided to the air compressor 16 through an air intake system 18, which is shown extending through and opening above the deck of the vessel 10. Compressed air is supplied through flow passages 20, 22, and 40, which may be formed of pipe, to the lower bow region of the vessel. Arrow 26 shows the direction of air travel in passage or pipe 22. The compressed air is directed to vents 28 strategically located at the bow of the vessel. The compressed air flows from the vents into grooves or channels 30 which extend from the bow to the stern of the vessel. A collection arrangement 32 is provided adjacent the stern of the vessel for recovering the compressed air and for separating it from entrained water. The compressed or pressurized air is retrieved through openings or collection holes 34 before it flows away from the stern of the ship. The compressed air and entrained water flows through the collection holes 34 into a separation chamber 36. The separation chamber 36 provides for fluctuations in the volume of the incoming air and entrained water. Compressed air, from which the entrained water has been separated in the chamber 36 is moved through passage 37 by a pump or blower 38 to the flow passages 24 to be recycled. A flow path 40 is provided between the separation chamber 36 and the compressed air storage system for the purpose of introducing and maintaining the desired air volume and pressure in chamber 36. Regulating valves 42 and 44 in flow paths 40 and 20 respectively are provided for the purpose of regulating the volume of air flow and the pressure of the air in the system. Valves 46 and 48 are for regulating, starting up and shutting down the system.

Figures 1A, 2, 2A, 2B, 2C:
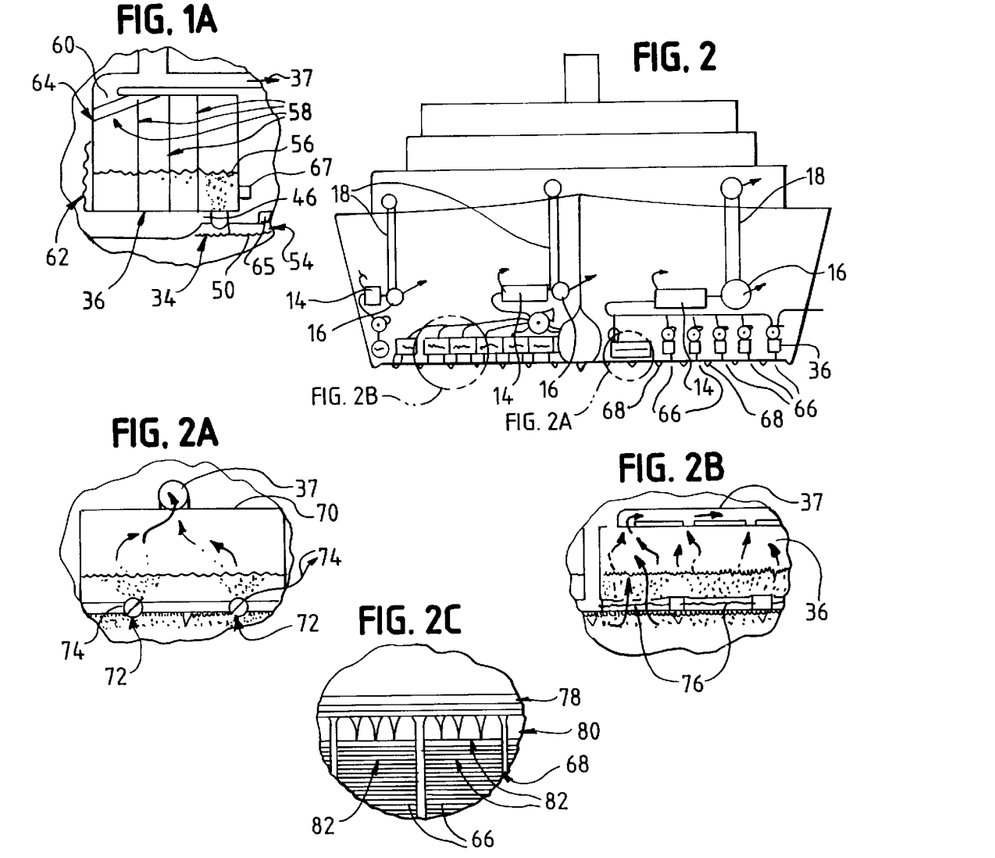
FIG. 1A is an enlarged view of the compressed air and water separation chamber shown in FIG. 1.
FIG. 2 is a bow elevation view of the marine vessel shown in FIG. 1, showing cross-sectional views of alternate compressed air recovery systems on the port and starboard sides at the stern of the vessel.
FIG. 2A is an enlarged view of the compressed air recovery system shown of the port side of the vessel in FIG. 2.
FIG. 2B is an enlarged view of the compressed air recovery system shown on the starboard side of the vessel in FIG. 2.
FIG. 2C is a further enlarged view of the compressed air recovery system shown on the starboard side of the vessel in FIG. 2.

Referring to FIG. 1A, the separation chamber 36 is shown in conjunction with a collection hole 34. Compressed air 54 flowing under the vessel 10 passes through a plurality of collection holes 34 into the bottom of the separation chamber 36. Ribs 50 and barriers 52 aid in directing the air flow to the collection holes. Most of the water entrained in the air is retained in the water at the bottom of the chamber 36 as the air passes through the upper surface 56 of the water, it then passes through mechanical filters or cyclonic separators which separate and remove more water from the compressed air, as indicated by the arrows 58 to an opening 60 near the top of the chamber 36, which includes a filter to extract water from the compressed air flow. Sensors 62 are provided at various heights in the collection chamber so as to provide an indication of the upper water surface 56 in the chamber. The sensors 62, through a suitable control system, control valves or regulators 42 and 44 in flow paths 40 and 20 respectively, and pump or blower 38. The control valves regulate the pressure and volume of air flow to the chamber 36 and through the flow passages 20 and 40. Control of the pump or blower 38 along with the regulation of the flow through flow passages 20 and 40, controls the flow of compressed air to the bow of the vessel through passage 22. By regulating the pressure of the air in chamber 36 with the regulating valve 42 and the output of blower or pump 38, the water surface level 56 is maintained within a desired range. A safety sensor 64 is provided near the top of the chamber 36, to shut down the system should the water surface level 56 reach an undesirable high level. A vibration inducing device, such an ultrasonic generator 65, may be provided at the stern end of the channels 30, or on the separation chamber 36, as indicated at 67.

Referring to FIG. 2 and FIGS. 2A, 2B, and 2C, alternate forms of collectors and separation chambers in accordance with this invention will be described. Referring to the portion of the vessel to the right in FIG. 2, a plurality of channels 66 are formed on the bottom of the vessel by a plurality of ribs 68. Each of the channels 66 is provided with a collector and a collection and separation chamber 36. Most of the collectors and collection and separation chambers 36 are shown to be associated with a single channel. However, they may be associated with two or more channels. FIG. 2A shows an enlarged view of collection holes and a separation chamber 70 which received air from two adjacent channels through a pair of opening 72 and a pair of valves 74, which may be of the regulating type. The compressed air from separation chambers 70 is directed through an opening and flow path 37 to a blower/pump 38 which recycles the air to the bow through air path 22 as shown in FIG. 1. Depending upon the design of the vessel and the particular characteristics of the system, sensors 62 and sensor 64 as shown in FIG. 1A may be associated with each of the separation chambers 70, or with only one or any number of them.

Referring again to FIG. 2, and to FIGS. 2B and 2C, an alternate form of collectors and collection and separation chambers in accordance with this invention is shown. In this form, the opening or collectors for recovering the compressed air are in the form of elongate control valves 76 which may be adjusted to permit the entry of the desired amount of air, without admitting an undesirable amount of water. The opening or collectors will also eliminate the need to tunnel the flow to a centrally located collection hole, thereby reducing drag and turbulence. The air flows into the chamber 36 as previously described, and then around baffles to a flow path 37 as in the previously described embodiment. FIG. 2C is a bottom view, with respect to FIG. 2B, showing the ribs 68, channels 66, barrier 78, widened collection holes 80, and air flow 82.

Figure 3:
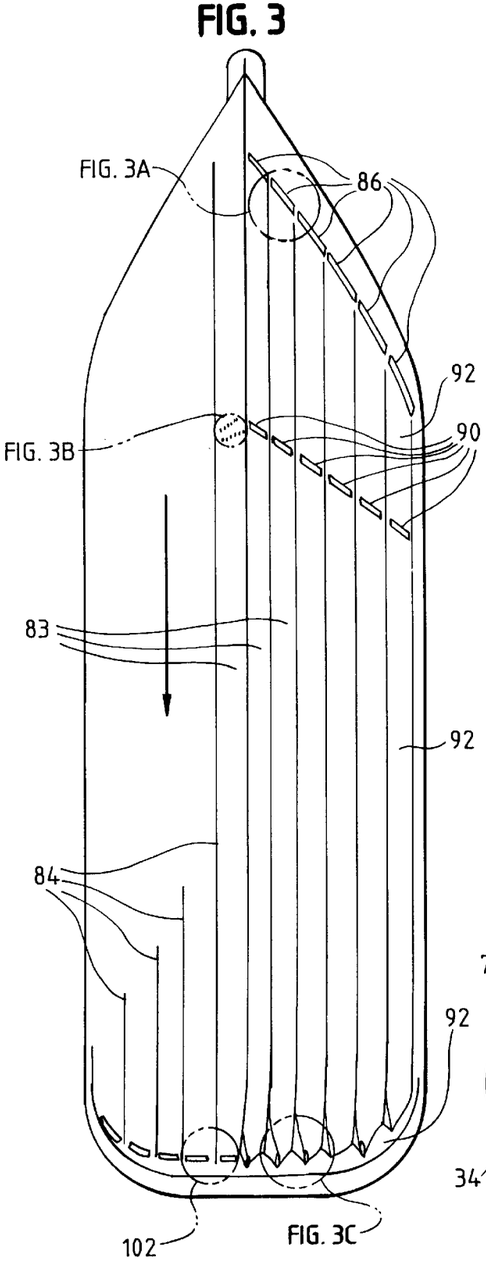
FIG. 3 is a bottom view of the hull of the marine vessel shown in FIG. 1.
Figure 3A:
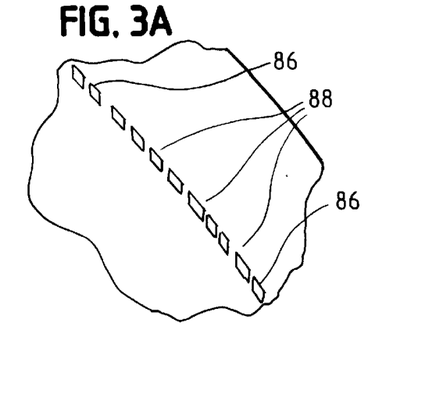
FIG. 3A is an enlarged view of the structure for introducing air under the hull of the marine vessel shown in FIG. 3.
Figure 3B:
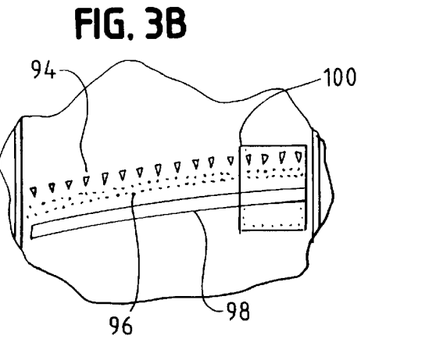
FIG. 3B is an enlarged view showing various ways for introducing compressed air under the hull of the marine vessel shown in FIG. 3.
Figure 3C:
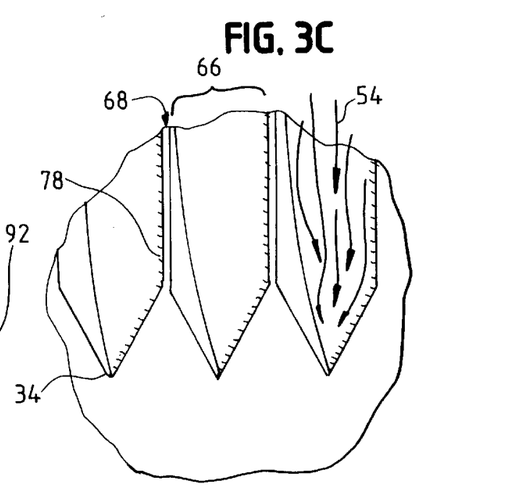
FIG. 3C is an enlarged view of the structure for recovering compressed air from under the hull at the stern of the marine vessel shown in FIG. 3.

Referring to FIG. 3 and FIGS. 3A, 3B, and 3C, further details of the compressed air distribution and collection systems of this invention will be described. The bottom view of the vessel shown in FIG. 3 illustrates grooves or channels 83 formed between a plurality of ribs 84 extending from the bow to the stern of the vessel. At the bow of the vessel, vents are shown at 86 where the compressed or pressurized air is introduced to the channels. In FIG. 3A it will be seen that the compressed air is introduced into the channels through a plurality of opening vents or nozzles 86. Hydrodynamic structures 88 may be used to add strength over the widened vents. The vents or nozzles 86 must be located such that the compressed air is trapped in the grooves or channels 83, rather than escaping over the bow profile of the vessel. Additional vents 90 may be provided to maintain a uniform air layer and cancel irregularities such as caused by wave action or oscillations in the flow as detected by optional sensors 92. As shown in FIG. 3B, a variety of venting options are contemplated for use by the system of this invention, such as hydrodynamic openings 94 for bubbles or streams, and small holes 96 or porous material 98 for bubbles. Vents 100 are shown as being removable for service. Vent arrangements 86, 94, 96, and 98 may be used alone or in combinations with each other. In accordance with this invention, a collection arrangement is provided at the stern of the vessel to collect, under pressure, as much of the air introduced at 86 and 90. As shown in FIG. 3C, the grooves on the right side of the vessel are tapered towards collection holes 34 formed in the center and at the top of the groove. Barrier wall 78 will aid in tunneling air toward collection holes 34. In an alternate arrangement shown at the stern on the left side of the vessel in FIG. 3, the compressed air is collected through elongated slots 102, which extend across the width of the channels.

Figures 4, 4A, 5, 5A, 6, 6A, 6B:
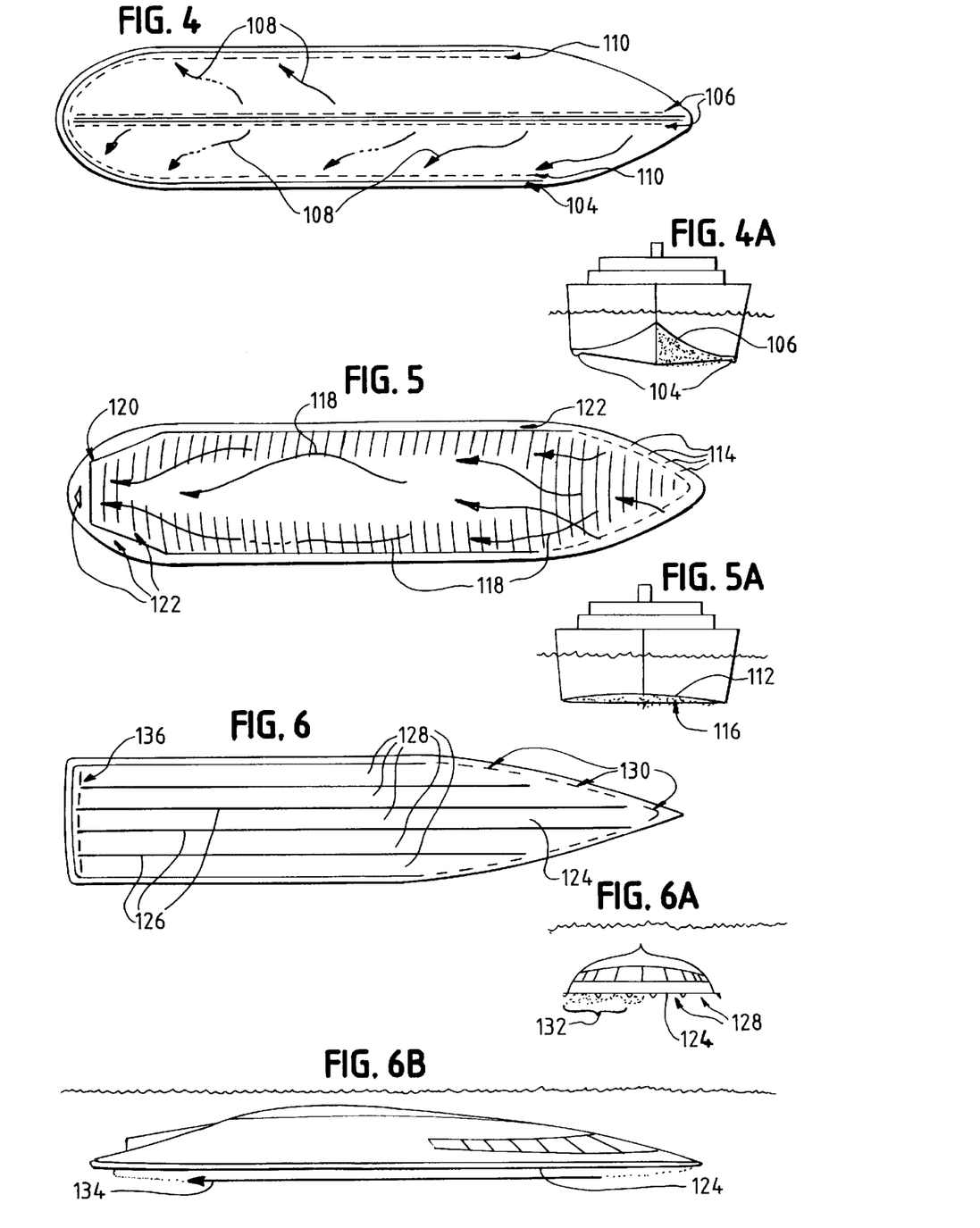
FIG. 4 is a bottom view of a marine vessel having a hull of a different shape from that shown in FIG. 1, which is provided with an energy efficient system for reducing water friction on the hull of a marine vessel in accordance with a second embodiment of this invention.
FIG. 4A is a front elevation view of the bow of the marine vessel shown in FIG. 4.
FIG. 5 is a bottom view of a marine vessel having a hull of still another different shape which is provided with an energy efficient system for reducing water friction on the hull of a marine vessel in accordance with a third embodiment of this invention.
FIG. 5A is a front elevation view of the bow of the marine vessel shown in FIG. 5.
FIG. 6 is a bottom view of a marine vessel having a hull of still another different type, commonly referred to as a submarine, which is provided with an energy efficient system for reducing water friction on the hull of a marine vessel in accordance with a fourth embodiment of this invention.
FIG. 6A is a front elevation view of the bow of the marine vessel shown in FIG. 6.
FIG. 6B is a side elevation view of the marine vessel shown in FIG. 6.

Referring to FIGS. 4 and 4A, the energy efficient system and method for reducing water friction with the hull of a marine vessel in accordance with this invention is shown as applied to a vessel having a different type of hull. In this embodiment spaced ribs are not provided over the bottom of the vessel to form a plurality of grooves, but rather only a single rib like projection is 104 is formed along the lower edge of the generally vertical sides and stern of the vessel. The compressed air is introduced at the bow and along the keel of the vessel through vents 106 as previously described, and flows rearwardly and towards the sides of the vessel as indicated by the arrows 108 in FIGS. 4 and 4A. As indicated by the dashed line 110, collection holes or slots are provided by the inside edge of the rib like projection 104 for recovering the compressed air.

In the embodiment of this invention as shown in FIGS. 5 and 5A, the hull of a vessel is formed with a concave bottom surface 112. Air vents 114 are provided at the bow of the vessel to introduce compressed air under the concaved surface as a layer or stream of air or bubbles 116. The air trapped under the concaved bottom surface 112 flows toward the stern as indicated by the arrows 118. As in the previously discussed embodiments, the compressed air is collected through collection holes 120 at the stern of the vessel. Systems such as those previously described are utilized to recycle the compressed air to again flow under the concave bottom surface 112 of the vessel. As set forth with respect to previously described embodiments of this invention, barriers 122 help direct the air flow and prevent it from escaping up the side of the vessel.

FIGS. 6, 6A and 6B show the method and system of this invention applied to submerged vessel such as a submarine. By providing a somewhat flat surface 124 with ribs 126, on the bottom of the vessel, channels or grooves 128 are formed through which air introduced through vents 130 may flow as a layer, as a stream, or as bubbles 132 in the direction of the arrow 134 to the stern of the vessel. The compressed air is collected at the stern through collection holes 136 for recycling as previously described.

Figure 7A:
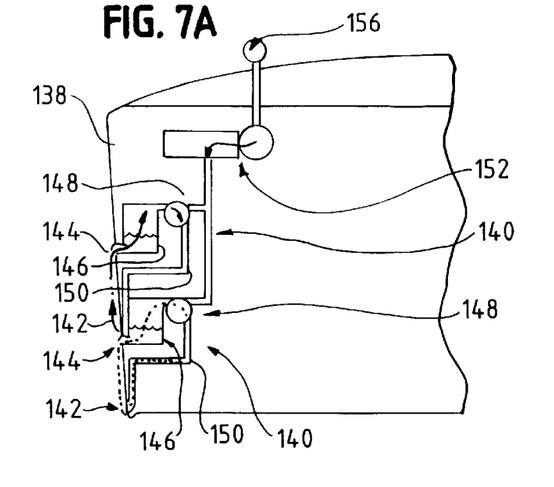
FIG. 7A is a bow elevation view of the starboard side of still another vessel showing the sidewall of the hull of the vessel provided with an energy efficient system for reducing water friction in accordance with a fifth embodiment of this invention.
Figure 7B:
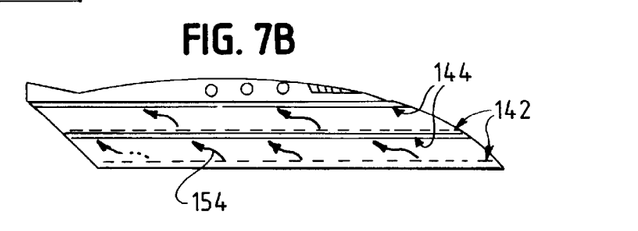
FIG. 7B is a partial side elevation view of the vessel shown in FIG. 7A.

Referring to FIGS. 7A and 7B, another embodiment shows the method and system of this invention applied to the near vertical sidewall 138 of a vessel. Depending upon the vertical height of the sidewall, a plurality of similar systems 140 are positioned one above the other to cover the sidewall with a stream of air. As shown in FIG. 7A, two similar systems 140 are provided. Each system 140 includes a vent 142, vertically spaced below a collection arrangement 144. Air received in the collection arrangement 144 is processed through collection and separations systems 146 which have previously been described. Recovered air from the systems 146 is recycled by a blower 148 and returned to vents 142 thru supply lines 150. A common or separate compressor, high pressure storage unit, and valved ducting 152 initializes the system with air and adds air as needed due to losses. The compressed air flows as indicated by the arrows 154 along the side of the vessel from the vents 142 to the collection arrangements 144. Initial and makeup supply air is provided from the atmosphere through an air intake arrangement 156. It should be recognized that each of the systems 140 will provide air at a different pressure, depending upon the depth of its vents 142 below the surface of the water.

Figure 8:
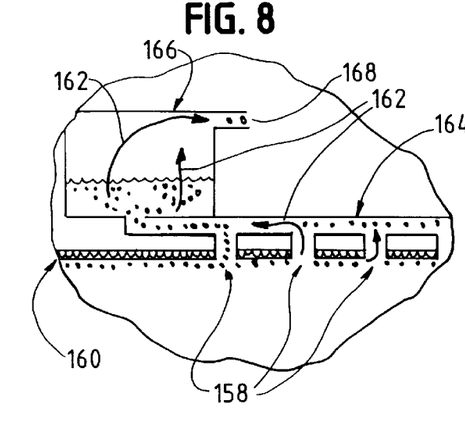
FIG. 8 is an enlarged view of another structure in accordance with this invention for recovering compressed air which has flowed along the underwater surface of a vessel provided with an energy efficient system for reducing water friction in accordance with a sixth embodiment of this invention.

FIG. 8 is an enlarged view of another compressed air collection and separation system in accordance with this invention. The compressed air flowing on the vessels underwater surface is collected through collection holes 158 in the wall 160 to flow as indicated by the arrows 162 through a channel 164 to a collection and separation chamber 166. The recovered compressed air is recycled through outlet 168 in the chamber 166.

Figure 9:
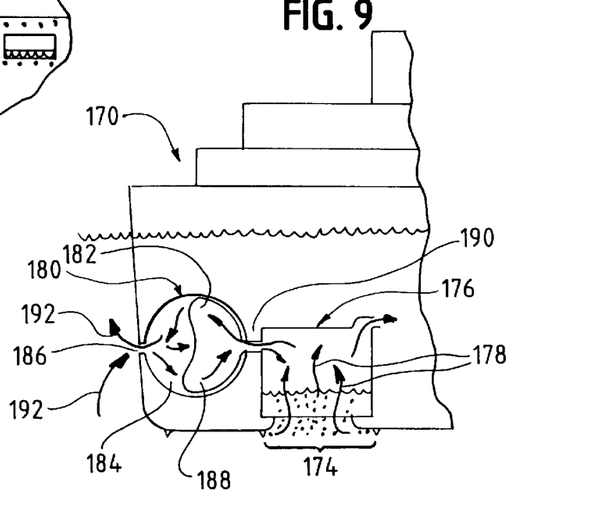
FIG. 9 is a partial cross-sectional view of a marine vessel showing an arrangement for establishing a desired volume of air in an energy efficient system for reducing water friction on the hull of a vessel in accordance with this invention.

FIG. 9 depicts a partial cross-sectional view of a marine vessel 170 showing an arrangement 172 for establishing the volume of air in an energy efficient system, for reducing water friction on the hull of a vessel in accordance with this invention. Compressed air recovered through collection hole 174 flows into a collection and separation chamber 176 as indicated by the arrows 178. A pressure chamber 180 is divided into two portions by a flexible bladder 182. A first portion 184 is filled with the water in which the vessel is supported through an opening 186. A second portion 188 is connected to the chamber 176 by a passage 190. Thus, the pressure of the water in volume 184 is applied to the flexible bladder 182, which will flex depending upon the relative pressures in the two portions 184 and 188 to establish an adjustable volume of compressed air in the second portion 188 and the chamber 176. Water flowing in and out of the portion 188 is indicated by the arrows 192.

Figure 10:
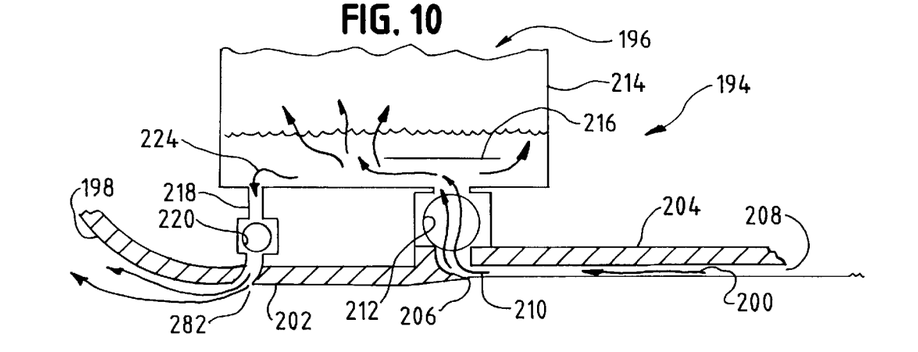
FIG. 10 is a partial cross-sectional view of a vessel provided with still another embodiment of a collector provided with a way for expelling excess water in a separation chamber and for recovering compressed air flowing along the bottom surface of a vessel provided with an energy efficient system for reducing water friction in accordance with a seventh embodiment of this invention.

FIG. 10 depicts a partial cross-sectional view of a marine vessel 194 showing another separator arrangement 196 for use in an energy efficient system for reducing water friction on the hull of a vessel in accordance with this invention. The bottom portion 198 of the hull of the vessel is provided with grooves or channels 200 as described in previous embodiments. The stern portion 202 of the bottom of the hull is lower than the portion 204, and is formed with a leading edge 206 which may be adjustable and which is used to separate the compressed air flowing in the grooves 200 from the water located below the grooves. The compressed air 208 separated by the leading edge 206 flows through collector opening 210, and a regulating valve 212 to collection chamber 214. The regulating valve 212 is adjusted to receive only the volume of air passing through the grooves 200. By adjusting the volume of flow to match that of the air, excess water is prevented from entering the chamber 214. A baffle 216 is provided in the chamber 214 to prevent the water entrained in the compressed air from rising directly into the compressed air space above the water level. To aid in regulating the water level in the chamber 214, and outlet 218 in the bottom of the chamber is connected through a flow regulator 220 to a discharge opening 222 in the stern portion of the bottom of the hull. In maintaining the desired air pressure in chamber 214, excess water 224 can be discharged through the opening 222. The system 218, 220, and 222 may be utilized with the other embodiments of this invention as disclosed herein.

Figure 11:
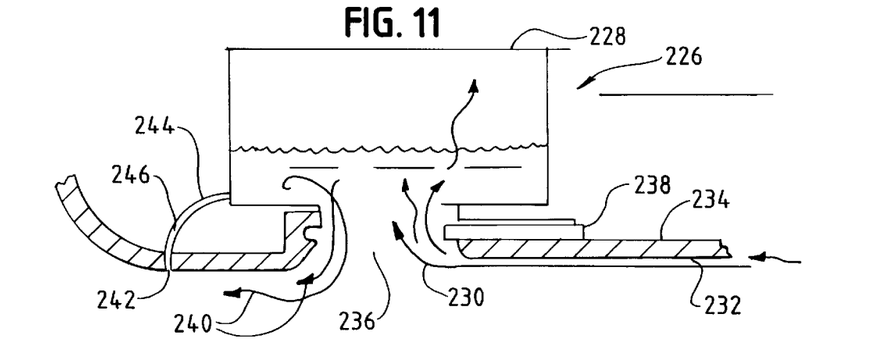
FIG. 11 is a partial cross-sectional view of a vessel provided with still another embodiment of a collector for recovery compressed air flowing along the bottom surface of the hull of the vessel which is provided with an energy efficient system for reducing water friction in accordance with an eighth embodiment of this invention.

FIG. 11 is a partial cross-sectional view of a vessel 226 provided with still another embodiment of a collector/separator 228 for recovery compressed air flowing along the bottom surface of a vessel provided with an energy efficient system for reducing water friction in accordance with another embodiment of this invention. Air 230 flowing in grooves 232 form in the bottom surface of the hull 234 enters the collection chamber 228 through opening 236. The volume of flow through opening 236 is regulated by a slide valve 238. By adjusting slide valve 238, the opening 236 may be made large enough to permit excess water entering the chamber 228 to exit through the stern portion of the opening as shown by arrows 240. Such that even more compressed air may be recovered, an opening 242, which may be in the form of a vee shaped recess formed across the bottom of the vessel is connected by a flow path 244 to the chamber 228. Compressed air which may flow past the opening 236, or which may be entrained in water leaving the stern portion of the opening 236 will be collected in the opening 242, which may be provided with a control valve 246. The air scavenger system may be utilized on any or all disclosed embodiments of this invention.

Figure 12:
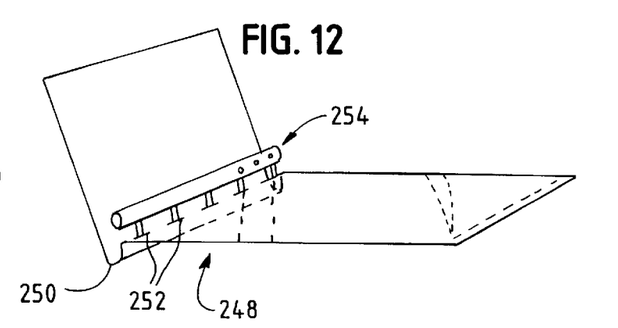
FIG. 12 is a partial cross-sectional view of a vessel having a Vee bottom, showing an alternate collector arrangement for recovering compressed air from the bottom surface of the vessel as it flows towards the sides of the hull of the vessel which is provided with an energy efficient system for reducing water friction in accordance with a ninth embodiment of this invention.

FIG. 12 is a partial cross-sectional view of a vessel having a Vee shaped hull 248 similar to that shown in FIGS. 4 and 4A. To collect the air retained by a baffle or ridge 250, feeder flow paths 254 which may be formed as conduits as shown, are connected to a major flow path or conduit 254 which supplies the recovered compressed air to a collector/separator as previously described. A discharge opening such as shown as 222 in FIG. 10 may be utilized to expel excess water from a separator chamber connected to the conduit 254 to eliminate turbulent back-flow in the conduits 254 and 252.

Figure 13:
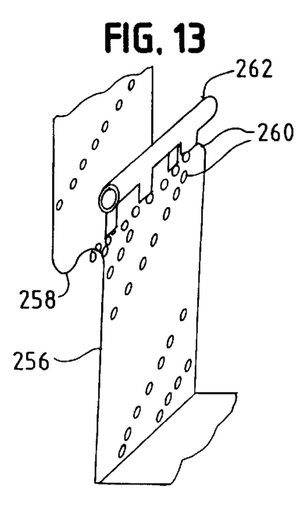
FIG. 13 is a partial cross-sectional view of the sidewall of a vessel showing an alternate collector arrangement for recovering compressed air flowing upward along the sidewall of the vessel which is provided with an energy efficient system for reducing water friction in accordance with a tenth embodiment of this invention.

FIG. 13 is a partial cross-sectional view of the sidewall 256 of a vessel similar to that shown in FIGS. 7A and 7B. To collect the air retained by the downwardly projecting ridge 258, feeder flow paths 260 and a major flow path 262 are provided, similar to those set forth in FIG. 12.

Figure 14:
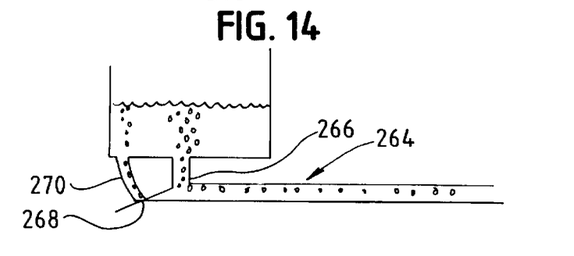
FIG. 14 is another embodiment of a collector arrangement in accordance with this invention for recovering compressed air flowing along the bottom surface of a vessel provided with an energy efficient system for reducing water friction in accordance with an eleventh embodiment of this invention.

FIG. 14 is still another embodiment of a collector arrangement 264 in accordance with this invention for recovering compressed air flowing along the bottom surface of a vessel. This arrangement is similar to that shown in FIG. 11, in that a supplemental path is provided for scavengering compressed air that is not picked up by the primary opening 266. The supplemental or scavenger opening 268 is provided on the trailing edge of the principal opening 266. The scavenger opening 268 is connected to the collector/separator by a flow path 270. The scavenger opening 268 may be provided with a valve for safety purposes and to shut down the system.

Figures 15, 15C:
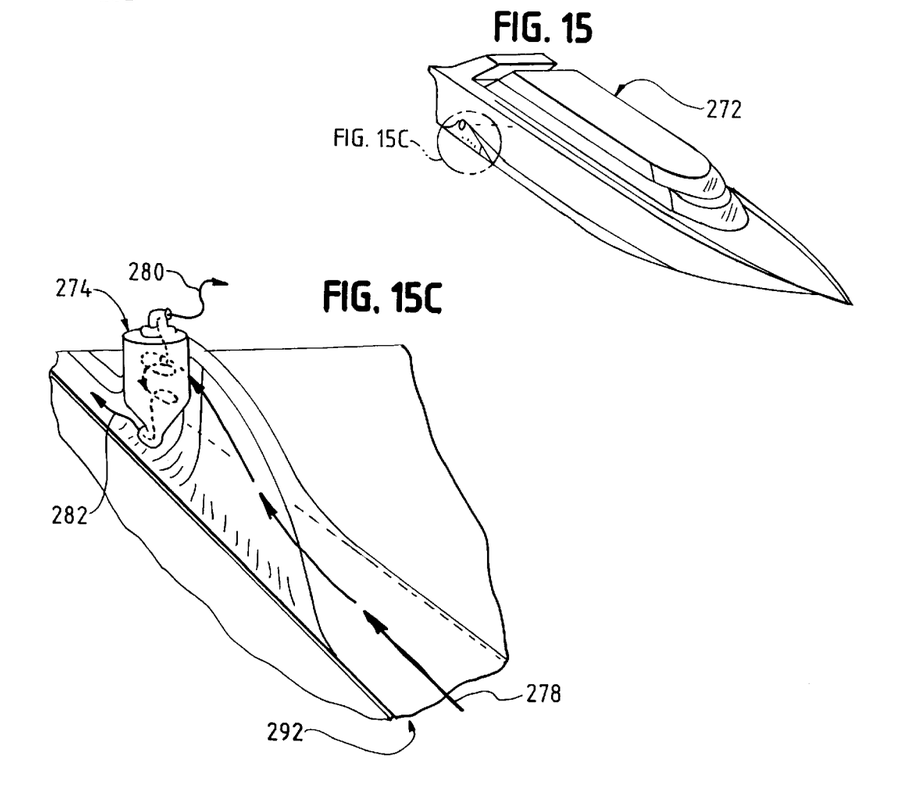
FIG. 15 is a perspective view of a vessel having a portion broken away to show still another form of collector for recovering compressed air flowing along the bottom surface of a vessel, the hull of the vessel being provided with an energy efficient system for reducing water friction in accordance with a twelfth embodiment of this invention.
FIG. 15C is an enlarged top perspective view of the collector shown in FIG. 15A.
Figure 15A:
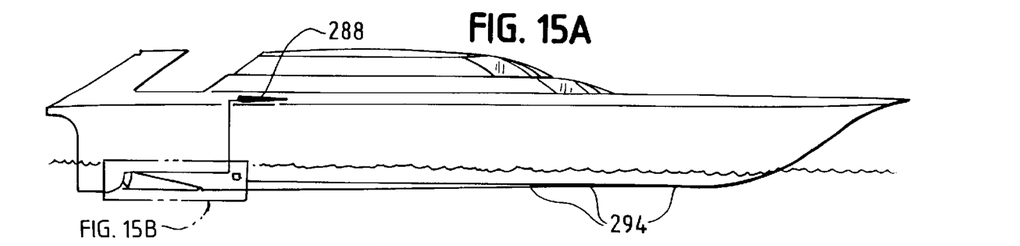
FIG. 15A is a side elevation view of the vessel shown in FIG. 15, with a portion broken away to show the collector provided in accordance with this invention.
Figure 15B:
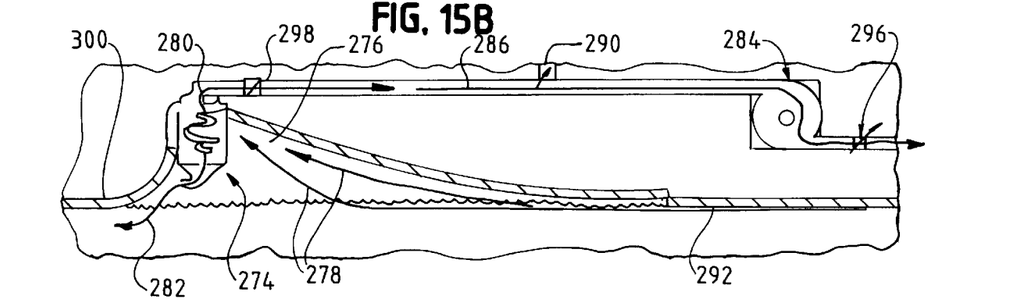
FIG. 15B is an enlarged elevation view of the collector shown in FIG. 15A.

FIGS. 15, 15A, 15B, and 15C, show a ship 272 provided with a cyclonic separator 274 integrated in the collection chamber 276 as shown in an enlarged sectional view in FIG. 15B and in a perspective view in FIG. 15C. Compressed air and entrained water 278 entering the cyclonic separator 274 is separated, with the compressed air being discharged at top 280, and water at the bottom 282 of the separator. Ship 272 is shown as being of a shallow draft, such that one blower/pump 284 is used to both recycle air flowing from the separator 274 through flow path 286 and to compress air flowing through valved intake 288. Flow of compressed air to the bottom surface of the hull 292 through vents 294 is regulated by a flow control device such as a valve 296. Similarly, flow of recycled air from the separator 274 to the blower/pump 284 is controlled by a regulator, such as a valve 298. Sensors 300 will control valves 290, 296, 298, and blower 284 to maintain the desired water level in the chamber. In this embodiment, as embodied in a shallow draft ship, the collector may be readily formed as an integral portion of a hull, which may be formed of a composite material. These integrated collector separators may be built and added to various shapes of hulls, both shallow and deep draft, and formed of composite, steel or other materials. They are most efficient with a minimal air redistribution depth, and are more suitable for use at higher speeds due to their length. Integral collector/separators are of simple construction and may be the desired choice for many vessels.

Figure 16:
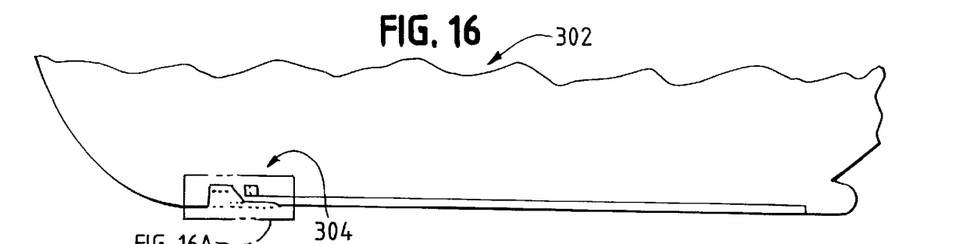
FIG. 16 is a partial side elevation view of a vessel provided with still another embodiment of a compressed air recovery system for use in an energy efficient system for reducing water friction in accordance with a thirteenth embodiment of this invention.
Figure 16A:
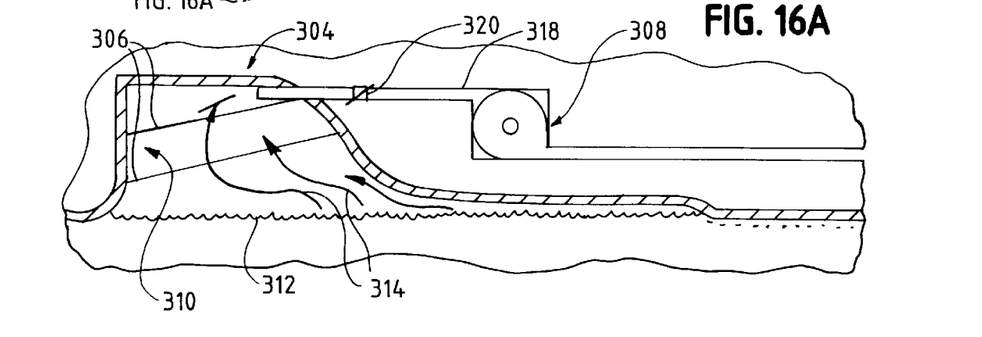
FIG. 16A is an enlarged side view, partially in section, of the compressed air recovery system shown in FIG. 16.

FIGS. 16 and 16A show a deep draft vessel 302 utilizing an integrated collector/separator 304 having mechanical separators 306. The initial high pressure air is provided by a high pressure compressor as in FIG. 1, (not shown in these Figs.) and is recycled by blower/pump 308. The system is provided with sensors 310 to control the water level 312. Arrows 314 show air movement. Flow from the integral collector/separator to the blower/pump through a conduit 318 is regulated by a control valve 320.

Figure 17:
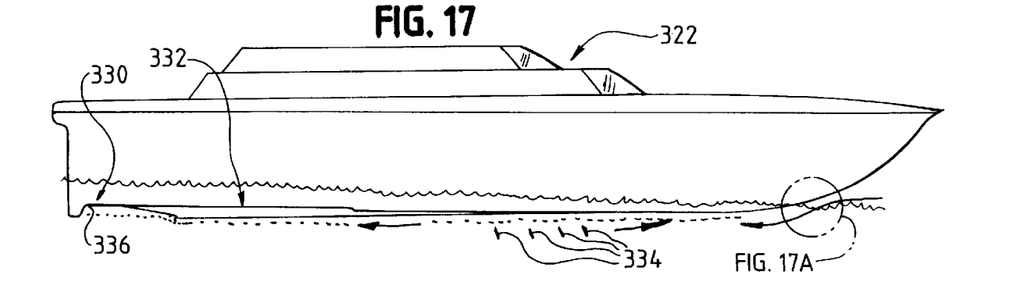
FIG. 17 is a side elevation view of a vessel provided with still another version of an energy efficient system for reducing water friction in accordance with a fourteenth embodiment of this invention.
Figure 17A:
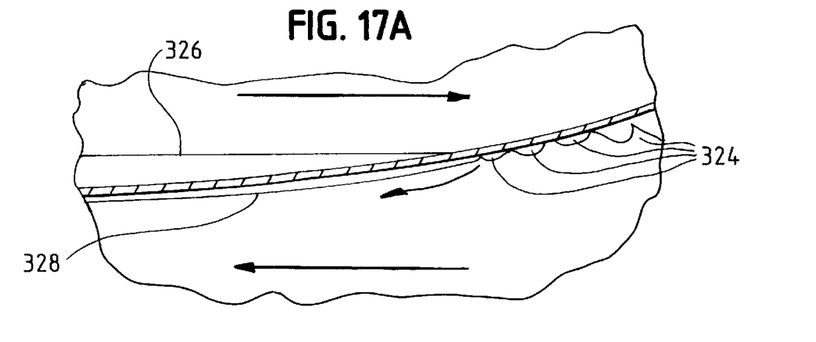
FIG. 17A is an enlarged cross-sectional view of the bow of the vessel in FIG. 17, taken at the water surface level.

FIGS. 17 and 17A show an embodiment of this invention wherein air flowing under the bow of a shallow draft ship 322 is entrapped and compressed under the hull of the ship and then recycled as described in previous embodiments. As shown in FIG. 17A, air 324 just above the water level 326 is entrapped under the hull and retained in channels 328. The entrapped air is collected by a collector/separator 330 adjacent the stern of the ship and recycled through flow path 332 to vents 334 located below the water level 326 near the bow of the ship. For instance, the collector may be at a depth of 9 feet under the water level 326, and the vents 334 located 1 or 2 feet below the water level 326. As described with respect to previous embodiments, a regulating system 336, including sensors and valves may be provided to control the water level in the collector 330 and the flow in path 332. In this case the ships hull is the compressor as the air is pushed by the passing water toward the stern, driven deeper and into compression as it goes to the stern which rests deeper in the water than the bow.

In review, the energy efficient system for reducing water friction on the hull of a ship in accordance with this invention, includes a compressed air/gas recycling system consists of an air/gas inlet provided with filtration that directs compressed air to a high pressure compressor/pump if required. The compressed air/gas is introduced into the system at various points to initialize the system. Valves are provided to control the air/gas flow in the supply lines. The high pressure air/gas is directed to strategically placed vents of various styles located below the water level near the bow of the ship. The air flows along the bottom of the vessel towards the stern of the vessel through various grooves or channels or under a semi-flat bottom, and is then retrieved through openings or collection holes before rising to the surface of the water at the stern of the vessel. The still pressurized air passes through collection/separation chambers that allow for fluctuation in the volume of incoming air/gas as needed. Sensors are provide to operate controls which adjust the water level in the collection/separation chamber as need. The water level is adjusted by increasing or decreasing the speed of the recycling blower where applicable, by adding new air/gas by opening a supply valve to the chamber, by transferring the air/gas to an area in need, or by opening or closing regulating valves. The collected and separated pressurized air is recycled using an energy efficient pump/blower when necessary, which creates enough positive pressure to force the air/gas through duct work back to the bow and through the vents, thus completing a cycle. A vessel whose bottom is at an angle to the water surface, sloping downward toward the stern, can compress the air as it moves rearward, providing the positive pressure required to force the air back through the vents at the bow of the ship.

Sensors may also be provided to control a safety shut down system. Valves operated in response to signals from the sensors are installed for safety and to regulate or shut down the system and stop water from entering the portion of the system provided only for air flow, or from otherwise entering the vessel.

A regulating bladder system may be utilized to regulate recovered air/gas more effectively. The bladder is subjected to the pressure of the water surrounding the ship at the level of the bladder, which helps to maintain a desired air volume as the vessel pitches in heavy seas. This invention is applicable to various hull configurations, including among others, flat and semi-flat. Slightly concaved bottoms may be useful multi-hull designs, as in catamaran style hulls.

While several embodiment of this invention have been described, various combinations of the features of the various embodiments may be combined to form still further embodiments. Thus, the following variations of features of the invention are listed such that their use in different configuration of the energy efficient system of this invention for reducing water friction on the hull of a marine vessel may be readily understood:

1. The recycled pressurized air may be used in ways other than those described. The embodiments shown are some of the ways to utilize the energy stored in the recovered compressed air or gas.
2. Gasses other than air could be used if desirable. Due to the recovery system of this invention, little gas would be lost. Gases other than air may be found more effect, easier to separate from water, or to have antifouling and/or anti-corrosion properties.
3. The systems may be individually engineered to fit the needs of various types, shapes, and sizes of vessels.
4. The system may utilize one or many grooves or channels of various lengths.
5. The distribution vents for compressed air/gas may vary in size, style and location so as to produce bubbles, streams or layers of air/gas to provide the desired effect for each particular vessel. The vents may be in the form of perforations, recessed elongated perforations, holes, slits, porous materials, membranes or various other forms. They may also be made removable for servicing or replacement.
6. Air/gas collection holes or opening may vary in size, style, shape and location, depending on the system, and may be made removable for service and replacement.
7. Air/gas paths under or along the sides of the vessel may be through perforations, channels, grooves, over semi-flat surfaces, or in other confining structures. The barriers forming paths will vary depending on the vessels hull shape.
8. Various water level and air and water pressure sensors may be provided in specific applications of this invention.
9. Power supplies for compressors, pumps, blowers, fans and automatic valves will vary depending on availability and needs.
10. Supplemental air/gas vents may be placed at various location along the length of the air/gas paths under or along the sides of a vessel to better regulate the air/gas interface with the water.
11. Controlled flow paths between air collection chambers, or interface areas may be provided to redistribute or balance air/gas flow in multiple path systems.
12. Sensors may be used to monitor air flow along paths below, at the sides, or at the stern of a vessel.
13. A single high pressure compressor and/or recycling blower, pump, or fan may be utilized for systems having multiple flow paths under or on the sides of a vessel. One compressor or blower may serve one, many, or all of the individual paths, or each path may have its own compressor or blower.
14. Dividers or filters in the collection chamber may assist in removing water from the air/gas and minimize water movement in the chamber. Further, biodegradable chemicals in the form of a gas or a solution may be added to aid in gas/water separation. Cyclonic separators may also be used for separation and may be located in or on the chamber or in the path between the chamber and the recycling blower. Vibrations, such as those provided by a sonic generator may be introduced just prior to or in the collection chambers to aid in unifying bubbles into a solitary air mass.

15. Sensors, valves and high pressure injectors may be used throughout the system to aid in air/gas management, and in initializing and shutting down the system.
16. Air/gas may be distributed along the keel at the center of the vessel and retrieved slightly rearward along the sides and in the stern on vessels with a slight vee-shape to the hull, or distributed along the sides and collected in the center for inverted vee-shaped hulls.
17. Air/gas may be distributed and collected at various levels along the sides and stern of a vessel having near vertical sides and stern to reduce the water drag on the sides or stern. One or more systems operating at different pressures may be stacked on top of another.
18. A high pressure storage tank may be utilized between the compressor/pump and the vents to store and recapture air/gas from the compressor/pump or flow paths with excess air/gas volume.
19. Vessels located completely under the water line, such as submarines may also utilize the system of this invention. Any air lost would be replenished and stored when the vessel is operating on the surface.
20. An internal maintenance cleansing system may be provided when the vessel is operated in waters which contribute salt, scale, and debris build up. These systems may be mechanical or in the form of pressurized water or cleansing solutions.
21. Non-powered vessels such as barges may have pressurized air/gas transferred to them from a tow vessel. The pressurized gas may be recovered for redistribution to another non-powered vessel having a shallower draft, or recycled to the source for repressurization.
22. Air volume in a system may be regulated by adjusting it in response to water pressure on the hull. For instance, by using a flexible bladder exposed on one side to the outer hull water pressure and forming part of the containment for the pressurized air/gas on the other side.
23. Various air compression devices such as piston compressors, rotary compressors, rotary blowers, centrifugal blowers, fans, the ships hull, and other such devices may be used in the system of this invention, depending on the particular needs of pressure and volume.
24. In the case of a system with multiple runs, a safety system may be provided such that if a run shuts down on one side of the heel of the ship, its like run on the opposite side of the ship will also shut down so as not to effect the steering of the vessel.

The energy effectiveness of the system of this invention will now be considered. The energy needed to operate the system will depend on the requirements of the recycling blowers, pumps/compressors, fans, and other power devices. However, the power requirements for each additional foot of depth at which the air is provided will remain constant, with 1 psi of pressure required to overcome each foot of depth.

Based upon an efficient system provided in accordance with this invention, as an example, 150 Hp would be required per 10,000 CFM for every foot in depth, that is:

| CFM Required | depth | HP | +3 PSI | HP Required | % of 10,000 |
|---|---|---|---|---|---|
| 10,000 cfm at | 1' | 150 hp | 450 hp | 600 hp | 6.0 |
| 10,000 cfm at | 2' | 300 hp | 450 hp | 750 hp | 7.5 |
| 10,000 cfm at | 4' | 750 hp | 450 hp | 1200 hp | 12.0 |
| 10,000 cfm at | 8' | 1200 hp | 450 hp | 1650 hp | 16.5 |
| 10,000 cfm at | 16' | 2400 hp | 450 hp | 2850 hp | 28.5 |
| 10,000 cfm at | 32' | 4800 hp | 450 hp | 5250 hp | 52.5 |
| 10,000 cfm at | 64' | 9600 hp | 450 hp | 10050 hp | 100.5 |

An additional 450 HP is required at each depth to provide an additional 3 psi of positive pressure needed to overcome the water pressure on the outer hull surface and to provide for air dispersion. The additional horsepower required will vary depending upon the particular system being used.

A large vessel may require as much or more that 10,000 cfm of air/gas to produce the desired air flow under or along the sides of the hull. For a vessel sitting 32' deep the required power would be 5250 hp as indicated, so as to generate and distribute the required 10,000 cfm if the energy in the air/gas is lost off the sides or stern. However, once in operation, using the recycling system of this invention, power would only be required to force the air/gas down approximately 2'. That is from 30' below the surface, that is the water level in the separation chamber back to the vents at 32'. Thus, in this example, the power required is only 750 hp and that additional power required to make up for a small loss of air/gas at the stern if it is not provided with an air barrier. Such additional power would be less than 10% of the required power without the energy efficient system of this invention.

As an example, a vessel with a 32 foot draft, 10,000 available horsepower, and requiring 10,000 cfm of air/gas will be considered. Without recycling of the air/gas in accordance with the method of this invention. If the effective gain is 10% greater at 19.25% or 1925 hp conserved with a system and 52.5% or 5250 hp is consumed to supply the air at 32 psi, there would be an observed loss of 33.25% or 3325 hp, the energy saved less the energy required to supply the air. However, with recycling in accordance with this invention a loss of 10% effectiveness at 17.5% or 1750 hp is conserved and with only 7.5% or 750 hp consumed in repressurizing the air, there would be an observed savings of 10% or 1000 hp. In this example, recycling savings in accordance with this invention will start at about 2.2 feet or a redistribution depth less 10%. A vessel without the system of this invention would become increasingly inefficient at greater depths, until after somewhat less than 9.83 feet, when it would contribute a loss rather than a gain in efficiency. More or less energy savings by use of the system of this invention will depend on how far below the water surface the recycling system must redistribute the air/gas to force the air/gas through the vents to the surface of the vessel. The example set forth above considered the redistribution depth to be 2 feet.

While the energy which may be saved by utilizing the system of this invention will vary with each application, following is one illustration of the energy savings which may be realized by the use of the system of this invention:

| | Without System | With Recycling System |
|---|---|---|
| HP Savings | 1925 HP | 1750 HP |
| Less the Energy Consumed by the system | −5250 HP | −750 HP |
| Equals the net Savings or Loss | −3325 HP | +1000 HP |
| As percentage of 10,000 HP | 33.25% Loss | 10% Savings |

The overall savings realized by the system of this invention will vary from application to application depending on the vessels configuration, with longer and deeper riding vessels realizing the greatest benefit. Some vessels may realize power savings of over 25%. The examples set forth are only to illustrate the potential energy savings, actual energy saving will vary with the particular application. The system of this invention may also be applied advantageously to lighter semi-planning craft whose bottoms rest as little as a few feet below the water surface, by utilizing a smaller redistribution depth. This may be as minimal as a few inches when using a collection/separation system such as is shown in FIGS. 15A, 15B, 15C, 16A, and 17.

While several embodiments of the invention have been shown, it should be apparent to those skilled in the art that what has been described are considered at present to be preferred embodiments of the energy efficient system for reducing water friction on the hull of a marine vessel in accordance with this invention. The water friction on the hull being reduced in accordance with this invention by providing a flow of air or other gas between the hull of the vessel and the water, and the efficiency being increased by capturing and recycling the compressed air or gas passing under the hull so as to avoid the loss of the energy stored in the compressed air or gas. As used herein, gas is intended to include air, or any other mixture of gases. Insofar as air is set forth herein, it is understood that any other gas could be substituted therefor if more desirable in certain applications. In accordance with the Patent Statute, changes may be made in the energy efficient system and method for reducing water friction on the hull of a marine vessel without actually departing from the true spirit and scope of this invention. The appended claims are intended to cover all such changes and modification which fall in the true spirit and scope of this invention.

What is claimed is:

1. A system for reducing the friction between the hull of a vessel and the water through which the vessel is moving comprising:
   A. a source of compressed gas,
   B. a distribution system, said distribution system receiving compressed gas from said source of compressed gas and distributing it to the outer surface of the hull, so as to provide an air interface between the outer surface of the hull and the water,
   C. compressed gas recovery means for recovering the compressed gas after it has passed over the outer surface of the hull,
   D. separation means for separating entrained water from the recovered compressed gas, and
   E. recycling means for returning the recovered compressed gas to the distribution system, whereby the friction between the outer surface of the hull and the water is reduced, and the energy in the compressed gas is recovered.

2. The system of claim 1, wherein the compressed gas is distributed to the outer surface of the hull near the bow of the vessel.

3. The system of claim 1, wherein the compressed gas recovery means is located near the stern of the vessel.

4. The system of claim 1, wherein barriers are provided on the outer surface of the hull to prevent the compressed gas from flowing to the upper surface of the body of water through which the vessel is moving.

5. The system of claim 4, wherein said barriers form channels for directing the flow of the compressed gas from the bow of the vessel toward the stern of the vessel.

6. The system of claim 5, wherein said source of compressed gas is the entrapment of air in the channels at the bow of the vessel.

7. The system of claim 5, wherein each of said channels is provided with a recovery means.

8. The system of claim 4, wherein said barriers means directs the flow of compressed gas from the bow of the vessel towards the stern of the vessel.

9. The system of claim 1, wherein the compressed gas is distributed to the outer surface of the hull through a plurality of apertures in the hull at the bow of the vessel.

10. The system of claim 1, wherein said separation means includes a chamber and a baffle is provided in said chamber to prevent water entrained in the recovery compressed gas from rising directly into the compressed gas located at the top of the separation chamber.

11. The system of claim 10, wherein a flow path is provided for discharging water from said separation chamber closer to the stern of the vessel than where said recovered compressed gas enters said compressed gas recovery means.

12. The system of claim 1, wherein said compressed gas recovery means includes a separation chamber in which the recovered compressed gas is separated from the entrained water.

13. The system of claim 12, wherein a filter is provided in a flow path from said separation chamber to said recycling means.

14. The system of claim 12, wherein a pressure chamber is provided with a flexible bladder which divides the pressure chamber into first and second portions, said first portion being exposed to the water pressure of the hull of the vessel at the level of the pressure chamber, and said second portion being connected to the separation chamber, the combined volume of air in said second portion and said separation chamber being adjustable in accordance with the water pressure in said first portion.

15. The system of claim 12, wherein flow control means are provided to regulate the flow of recovered compressed gas into said chamber.

16. The system of claim 12, wherein the level of water in said chamber is regulated in response to water level sensors in said chamber.

17. The system of claim 12, wherein a flow path is provided between said source of compressed gas and said chamber for the purpose of maintaining a desired gas volume and pressure in said chamber.

18. The system of claim 1, wherein said recycling means includes a means for equalizing the pressure of said recovered compressed gas with that of said source as it is returned to said distribution system.

19. The system of claim 18, wherein said means for equalizing the pressure is a blower/pump.

20. The system of claim 1, wherein flow control means are provided in said distribution system.

21. The system of claim 1, wherein the hull of the vessel has an essentially flat bottom with said distribution system distributing the compressed gas to the outer surface of the flat bottom at the bow of the vessel, so as to provide an air interface between the flat bottom and the water, said compressed gas recovery means recovering the compressed gas at the stern of the vessel.

22. The system of claim 21, wherein the vessel is a submarine type vessel.

23. The system of claim 21, wherein said distribution system also distributes the compressed gas to the outer surface of the flat bottom at one or more additional locations between the bow and the stern of the vessel.

24. The system of claim 1, wherein the hull of the vessel has a concave bottom with said distribution system distributing the compressed gas to the outer surface of the concave bottom at the bow of the vessel so as to provide an air interface between the concave bottom and the water, said compressed gas recovery means recovering the compressed gas at the stern of the vessel.

25. The system of claim 1, wherein said separation means is a cyclonic separator for separating recovery compressed gas from entrained water.

26. The system of claim 1, wherein said source of compressed gas also receives said recovered compressed gas.

27. The system of claim 1, wherein flow control means are provided to regulate the flow of compressed gas through said distribution system.

28. In a marine vessel having a hull for supporting the vessel in a body of water having an upper surface, at least a first portion of the outer surface of the hull being located below the upper surface of the body of water, a system for reducing water friction on the at least a first portion of the outer surface of the hull of the marine vessel comprising:
   a source of compressed gas,
   a distribution system, said distribution receiving compressed gas from said source of compressed gas and releasing it under the upper surface of the body of water adjacent said first portion of the outer surface of the hull, forward of the stern of the vessel,
   a barrier arrangement provided on said at least first portion of the outer surface of the hull, for retaining the compressed gas adjacent the outer surface of the hull,
   a collection arrangement located closer to the stern of the vessel than where said compressed gas is released adjacent the first portion of the outer surface of the hull, for collecting the compressed gas retained by said barrier arrangement as it flows toward the stern of the vessel,
   a separation means for separating entrained water from the collected compressed gas, and
   a conduit system for returning the collected compressed gas to said distribution system to be recycled, whereby the friction between the outer surface of the hull and the water is reduced, and the energy in the compressed gas in recovered.

29. The system of claim 28, wherein said barrier arrangement is formed as a plurality of ridges projecting from the at least a first portion of the outer surface of the hull and extending between the bow and the stern of the vessel.

30. In a marine vessel having a hull, the outer surface of the hull, which is normally in contact with the water,
   a source of compressed gas for supplying a gas under pressure to the outer surface of the hull which is normally in contact with the water,
   a barrier arrangement for retaining the compressed gas in contact with the outer surface of the hull as it flows toward the stern of the vessel from the bow,
   a gas collection arrangement towards the stern of the vessel for collecting the compressed gas which flows from said source, retained by said barrier arrangement, towards the stern of said vessel,
   a separation means for separating entrained water from the collected compressed gas, and
   a conduit system for returning the collected compressed gas towards the bow of the vessel to be combined with the compressed gas provided by the source, to again be supplied to the outer surface of the hull which is normally in contact with the water.

31. A marine vessel hull, the outer surface of the hull which vessel which is normally in contact with the water being provided with a barrier arrangement for confining the flow of pressurized gas along the outer surface of at least a portion of the hull which is under water, and for preventing the escape of said pressurized gas to the upper surface of the water,
   a source of compressed gas for supplying a gas under pressure to said barrier arrangement towards the bow of the hull,
   a compressed gas collection arrangement towards the stern of the hull for collecting the compressed gas which flows from said source through said barrier arrangement towards the stern of said hull,
   a separation means for separating entrained water from the collected compressed gas, and
   a conduit system for returning the collected compressed gas towards the bow of the hull to be supplied, with the compressed gas provided by the source, to said barrier arrangement.

32. An energy efficient method for reducing water friction on the hull of a marine vessel including the steps of:
   A. generating a supply of compressed gas and providing it to a distribution system,
   B. releasing the compressed gas under the vessel at the bow of the vessel from the distribution system,
   C. the released compressed gas flowing toward the stern of the vessel adjacent the outer surface of the hull so as to provide a gas interface between the outer surface of the hull and the water,
   D. recovering the compressed gas at the stern of the vessel,
   E. separating entrained water from the recovered compressed gas, and
   F. recycling the recovered compressed gas through the distribution system.

33. The method of claim 32, wherein the step of releasing the compressed gas includes the step of regulating the flow of compressed gas to provide the optimum amount necessary to provide the desired gas interface between the outer surface of the hull and the water.

34. The method of claim 32, wherein the step of generating a supply of compressed gas includes the step of supplying the compressed gas at the pressure necessary to release it under the bow of the vessel.

35. The method of claim 32, wherein the step of recycling the recovered compressed gas includes the step of further compressing the recovered compressed gas to the pressure of the compressed gas supplied to the distribution system from the generated supply.

36. The method of claim 32, wherein the released gas is directed to the stern of the vessel through channels formed on the outer surface of the hull of the vessel.

37. A system for reducing the friction between the hull of a vessel and the water through which the vessel is moving comprising:
   A. a source of compressed gas,
   B. a distribution system, said distribution system receiving compressed gas from said source of compressed gas and distributing it to the outer surface of the hull, so as to provide an air interface between the outer surface of the hull and the water,
   C. barriers on the outer surface of the hull to prevent the compressed gas from flowing to the upper surface of the body of water through which the vessel is moving, said barriers forming channels for directing the flow of the compressed gas from the bow of the vessel toward the stern of the vessel, D. compressed gas recovery means for recovering the compressed gas after it has passed over the outer surface of the hull, said recovery means includes a control valve at the stern end of each of said channels for regulating the flow of recovered compressed gas, and E. recycling means for returning the recovered compressed gas to the distribution system, whereby the friction between the outer surface of the hull and the water is reduced, and the energy in the compressed gas is recovered.

38. The system of claim 37, wherein each of said control valves provides a flow path essentially the same width as said channel with which it is associated.

39. The system of claim 37, wherein each of said control valves is a slide valve.

40. A system for reducing the friction between the hull of a vessel and the water through which the vessel is moving comprising:

A. a source of compressed gas,

B. a distribution system, said distribution system receiving compressed gas from said source of compressed gas and distributing it to the outer surface of the hull, so as to provide an air interface between the outer surface of the hull and the water, C. barriers on the outer surface of the hull to prevent the compressed gas from flowing to the upper surface of the body of water through which the vessel is moving, said barriers forming channels for directing the flow of compressed gas from the bow of the vessel towards the stern of the vessel, D. compressed gas recovery means for recovering the compressed gas after it has passed over the outer surface of the hull, said compressed gas recovery means includes a first portion of the hull of the vessel at the stern which extends below (said channels) and form second barriers directing the compressed gas to collection holes located at the top of the stern end of each channel, and E. recycling means for returning the recovered compressed gas to the distribution system, whereby the friction between the outer surface of the hull and the water is reduced, and the energy in the compressed gas is recovered.

41. The system of claim 40, wherein said first portion of the hull includes a leading edge on an adjustable portion, wherein the leading edge may be adjusted to separate the compressed gas in the channels from the water located below the channels.

42. A system for reducing the friction between the hull of a vessel and the water through which the vessel is moving comprising:

A. a source of compressed gas,

B. a distribution system, said distribution system receiving compressed gas from said source of compressed gas and distributing it to the outer surface of the hull, so as to provide an air interface between the outer surface of the hull and the water, the hull of the vessel having an essentially flat bottom with said distribution system distributing the compressed gas to the outer surface of the flat bottom at the bow of the vessel, so as to provide an air interface between the flat bottom and the water, C. compressed gas recovery means for recovering the compressed gas after it has passed over the outer surface of the hull, said compressed gas recovery means recovering the compressed gas at the stern of the vessel, a portion of the vessel at the stern of the vessel being lower than said outer surface of the flat bottom, with said gas recovery means recovering the compressed gas through apertures located between the stern end of said flat bottom and the portion of the vessel at the stern of the vessel which is lower than the outer surface of the flat bottom, and D. recycling means for returning the recovered compressed gas to the distribution system, whereby the friction between the outer surface of the hull and the water is reduced, and the energy in the compressed gas is recovered.

43. A system for reducing the friction between the hull of a vessel and the water through which the vessel is moving comprising:

A. a source of compressed gas,

B. a distribution system, said distribution system receiving compressed gas from said source of compressed gas and distributing it to the outer surface of the hull, so as to provide an air interface between the outer surface of the hull and the water, a portion of the hull of the vessel being formed by generally vertical side walls, the distribution system receiving compressed gas from said source and distributing it to the outer surface of the vertical sidewalls, through apertures in the sidewalls, C. compressed gas recovery means for recovering the compressed gas after it has passed over the outer surface of the hull, said compressed gas recovery means being located on the sidewall above the apertures through which the compressed gas is distributed, and D. recycling means for returning the recovered compressed gas to the distribution system, whereby the friction between the outer surface of the hull and the water is reduced, and the energy in the compressed gas is recovered.

44. The system of claim 43, wherein said apertures extend in a generally horizontal row along the sidewalls from the bow to the stern of the vessel, and said gas recovery means also extends in a generally horizontal direction from the bow to the stern of the vessel.

45. The system of claim 43, wherein a plurality of rows of horizontally extending apertures for the distribution of gas are spaced vertically apart from each other on the sidewall of the vessel and rows of gas recovery means are located above each row of apertures and just below the next higher row of apertures for the distribution of gas, except for the uppermost row of gas recovery means.

46. A system for reducing the friction between the hull of a vessel and the water through which the vessel is moving comprising:

A. a source of compressed gas,

B. a distribution system, said distribution system receiving compressed gas from said source of compressed gas and distributing it to the outer surface of the hull, so as to provide an air interface between the outer surface of the hull and the water, C. compressed gas recovery means for recovering the compressed gas after it has passed over the outer surface of the hull, said compressed gas recovery means includes a first portion of the hull of the vessel at the stern which extends below the forward portion of the outer surface of the hull over which the air interface is provided, with the compressed gas being recovered through at least one aperture located adjacent the bow side of said first portion, and D. recycling means for returning the recovered compressed gas to the distribution system, whereby the friction between the outer surface of the hull and the water is reduced, and the energy in the compressed gas is recovered.

47. A system for reducing the friction between the hull of a vessel and the water through which the vessel is moving comprising:

A. a source of compressed gas,

B. a distribution system, said distribution system receiving compressed gas from said source of compressed gas and distributing it to the outer surface of the hull, so as to provide an air interface between the outer surface of the hull and the water, C. compressed gas recovery means for recovering the compressed gas after it has passed over the outer surface of the hull, said compressed gas recovery means including a vibration inducing means which promotes compressed gas bubbles to unite, and D. recycling means for returning the recovered compressed gas to the distribution system, whereby the friction between the outer surface of the hull and the water is reduced, and the energy in the compressed gas is recovered.

48. An energy efficient method for reducing water friction on the hull of a marine vessel including the steps of:

A. generating a supply of compressed gas and providing it to a distribution system, B. releasing the compressed gas under the vessel at the bow of the vessel from the distribution system, C. the released compressed gas flowing toward the stern of the vessel adjacent the outer surface of the hull so as to provide a gas interface between the outer surface of the hull and the water, D. recovering the compressed gas at the stern of the vessel, E. storing a volume of the recovered compressed gas, such that entrained water may be removed from the recovered compressed gas, and F. recycling the recovered compressed gas through the distribution system.

* * * * *